United States Patent
Kim

(10) Patent No.: US 9,065,352 B2
(45) Date of Patent: Jun. 23, 2015

(54) MEDIUM VOLTAGE INVERTER CONTROL APPARATUS AND MEDIUM VOLTAGE INVERTER SYSTEM

(71) Applicant: LSIS CO., LTD., Anyang-si, Gyeonggi-do (KR)

(72) Inventor: Kyung Sue Kim, Bucheon-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 245 days.

(21) Appl. No.: 13/753,306

(22) Filed: Jan. 29, 2013

(65) Prior Publication Data
US 2013/0193890 A1    Aug. 1, 2013

(30) Foreign Application Priority Data
Jan. 30, 2012    (KR) .................... 10-2012-0009047

(51) Int. Cl.
*H02P 1/24*    (2006.01)
*H02M 7/44*    (2006.01)
*H02P 1/54*    (2006.01)
*H02P 1/26*    (2006.01)

(52) U.S. Cl.
CPC . *H02M 7/44* (2013.01); *H02P 1/54* (2013.01); *H02P 1/26* (2013.01)

(58) Field of Classification Search
CPC ...... H02P 25/145; H02P 6/10; H02P 23/0059
USPC .................................................. 388/907, 911
See application file for complete search history.

(56) References Cited

U.S. PATENT DOCUMENTS

| 4,674,024 | A | * | 6/1987 | Paice et al. | ...................... 363/71 |
| 5,191,519 | A | * | 3/1993 | Kawakami | ...................... 363/71 |
| 5,642,275 | A | * | 6/1997 | Peng et al. | ..................... 363/137 |
| 6,075,350 | A | * | 6/2000 | Peng | ............................. 323/207 |
| 7,999,418 | B2 | * | 8/2011 | Wang et al. | ................... 307/151 |
| 8,749,187 | B2 | * | 6/2014 | Busch et al. | ................. 318/461 |

FOREIGN PATENT DOCUMENTS

| JP | 55157987 | 12/1980 |
| JP | 2000050529 | 2/2000 |
| JP | 2001169576 | 6/2001 |
| JP | 2003-235277 | 8/2003 |
| KR | 1990-0007696 | 10/1990 |

OTHER PUBLICATIONS

Zewei, et al., "Knowledge of the Inverter," Popularizing Series of Electronic Equipment and Power Supply Technology, Aug. 1988, 8 pages.

* cited by examiner

*Primary Examiner* — Rina Duda
(74) *Attorney, Agent, or Firm* — Lee, Hong, Degerman, Kang & Waimey

(57) ABSTRACT

An exemplary embodiment of the present disclosure includes a medium voltage inverter control apparatus and a medium voltage inverter system using the same. The medium voltage inverter control apparatus determines input voltage information by receiving an input voltage of a medium voltage inverter, compares an output command of the medium voltage inverter with an output of a first PLL unit to output a difference therebetween, and synchronizes the output command of the medium voltage inverter using the difference.

11 Claims, 2 Drawing Sheets

MEDIUM VOLTAGE INVERTER CONTROL APPARATUS AND MEDIUM VOLTAGE INVERTER SYSTEM

Pursuant to 35 U.S.C. §119 (a), this application claims the benefit of earlier filing date and right of priority to Korean Patent Application No. 10-2012-0009047, filed on Jan. 30, 2012, the contents of which are hereby incorporated by reference herein in their entirety.

BACKGROUND OF THE DISCLOSURE

1. Field of Endeavor

The present disclosure relates to a medium voltage inverter control apparatus and a medium voltage inverter system using the same.

2. Background

This section provides background information related to the present disclosure which is not necessarily prior art.

Generally, in order to control a multi-soft starter starting a plurality of motors using an inverter, an operation of switching a power supply inputted into the motors from an inverter output power to a commercial power source is required. At this time, the multi-soft starter is a mechanism using a method sequentially activating a plurality of motors where an inverter output is connected to one motor, which is then accelerated at an operation speed with a frequency same as that of the commercial power source, where an input power of the motor is changed to the commercial power source and an inverter output is connected to another motor, which is then accelerated to be changed to the commercial power source.

In a medium voltage inverter system, a change between an inverter output and the commercial power source is largely implemented by a VCB (Vacuum Circuit Breaker) or a VCS (Vacuum circuit Switch), where an electric shock is applied to a motor, an inverter and the commercial power source by various causes during changing operation.

FIG. 1 is an exemplified view illustrating an operation of a multi-soft starter in a medium voltage system.

Referring to FIG. 1, in order to start a motor (M1) in a conventional medium voltage inverter system, a line (A) is connected to start a medium voltage inverter (100). That is, the line (A) is interrupted after matching a frequency of the motor (M1) to that of the commercial power source, a line (B) is connected where the commercial power source and the motor (M1) are connected. Thereafter, motors are sequentially driven up to a motor (Mn) in the same fashion. This type of system is largely used for water pump facilities, and speed of the last motor (Mn) is generally controlled by the medium voltage inverter (100).

FIG. 2 is an exemplified view illustrating an operation of power change of FIG. 1. Referring to FIG. 2, an inverter switch (SW, 110) is turned off while the motor (M) is connected to the medium voltage inverter (100) via the line (A), a grid switch (SW, 120) of line (B) is connected and the commercial power source is connected to the motor (M).

However, in a case a medium voltage motor is used, an electric shock is generated by the change of the commercial power source during operation of the multi-soft starter, making it difficult to apply the multi-soft starter method to the medium voltage motor.

SUMMARY OF THE DISCLOSURE

This section provides a general summary of the disclosure, and is not a comprehensive disclosure of its full scope or all of its features.

The present disclosure provides a medium voltage inverter control apparatus configured to minimize an electric shock applied to a motor, in a case the motor is switched from an inverter output to a commercial power source, and a medium voltage inverter system using the same.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided a medium voltage inverter control apparatus, the apparatus comprising: a first PLL (Phase Locked Loop) unit configured to determine input voltage information by receiving an input voltage of a medium voltage inverter; a comparator configured to compare an output command of the medium voltage inverter with an output of the first PLL unit to output a difference therebetween; and a synchronous controller configured to synchronize the output command of the medium voltage inverter using the difference.

Preferably, but not necessarily, the apparatus may further comprise a first detecting unit arranged at an input terminal of the medium voltage inverter and configured to detect the input voltage of the medium voltage inverter and to transmit the input voltage to the first PLL unit.

Preferably, but not necessarily, the apparatus may further comprise an output unit configured to output an output voltage to the medium voltage inverter using a synchronized output command of the medium voltage inverter.

Preferably, but not necessarily, the apparatus may further comprise a second PLL unit configured to determine output voltage information by receiving the output voltage from the output unit.

Preferably, but not necessarily, the synchronous controller may synchronize the output command of the medium voltage inverter by receiving the output voltage information from the second PLL unit.

In another general aspect of the present disclosure, there is provided a medium voltage inverter system driving a motor, the system comprising: a first switch configured to switch an output voltage from the medium voltage inverter to a motor; a second switch configured to switch a commercial power source to the motor; a reactor arranged between the first switch and the medium voltage inverter; and a controller configured to synchronize the output voltage of the medium voltage inverter with the commercial power source to provide a synchronized output command to the medium voltage inverter.

Preferably, but not necessarily, the controller may comprise a first PLL unit configured to determine input voltage information by receiving an input voltage of a medium voltage inverter; a comparator configured to compare an output command of the medium voltage inverter with an output of the first PLL unit to output a difference therebetween; and a synchronous controller configured to synchronize the output command of the medium voltage inverter using the difference.

Preferably, but not necessarily, the apparatus may further comprise a first detecting unit arranged at an input terminal of the medium voltage inverter and configured to detect the input voltage of the medium voltage inverter and to transmit the input voltage to the first PLL unit.

Preferably, but not necessarily, the controller may further comprise an output unit configured to output the output voltage to the medium voltage inverter using a synchronized output command of the medium voltage inverter.

Preferably, but not necessarily, the controller may further comprise a second PLL unit configured to determine output voltage information by receiving the output voltage from the output unit.

Preferably, but not necessarily, the synchronous controller may synchronize the output command of the medium voltage inverter by receiving the output voltage information from the second PLL unit.

Preferably, but not necessarily, a reactance of the reactor may be determined in consideration of a degree of restricting a size of a circulating current in response to a voltage difference between the output voltage of the medium voltage inverter and the commercial power source.

Preferably, but not necessarily, the reactance of the reactor may be determined in consideration of a drop portion of the output voltage of the medium voltage inverter generated by the reactor.

The present disclosure has an advantageous effect in that a commercial power source and an output voltage of an inverter are synchronized to perform a switching operation whereby an electric shock generated by a voltage difference between the commercial power source and the output voltage of the inverter can be considerably reduced, and an electric shock caused by a current can be reduced by installing a reactor between the commercial power source and the output voltage of the inverter.

Another advantageous effect is therefore that an operation of a motor is passed over to the commercial power source in a case repair/maintenance of the inverter is required while the speed of the motor is controlled by the inverter, and the present disclosure can be applied, in a case the inverter is inoperative to enable a stable operation of the motor.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

Figure 1:
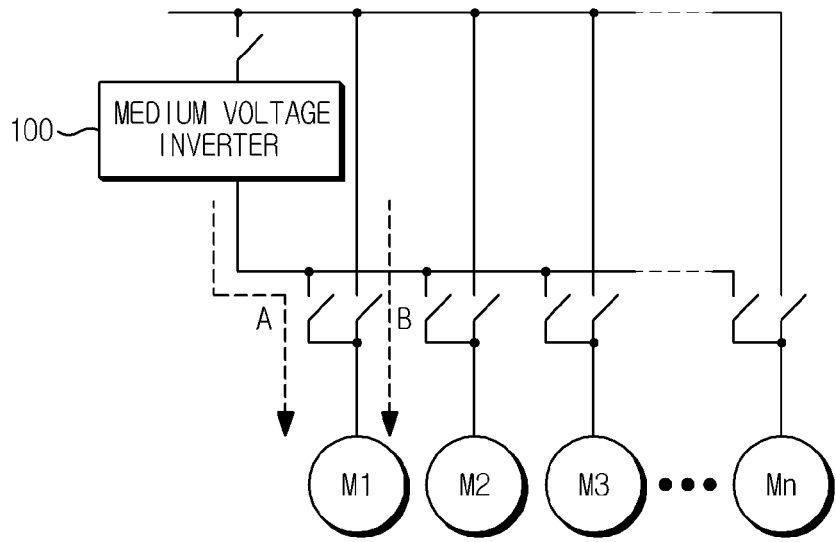
FIG. 1 is an exemplified view illustrating an operation of a multi-soft starter in a medium voltage system.
Figure 2:
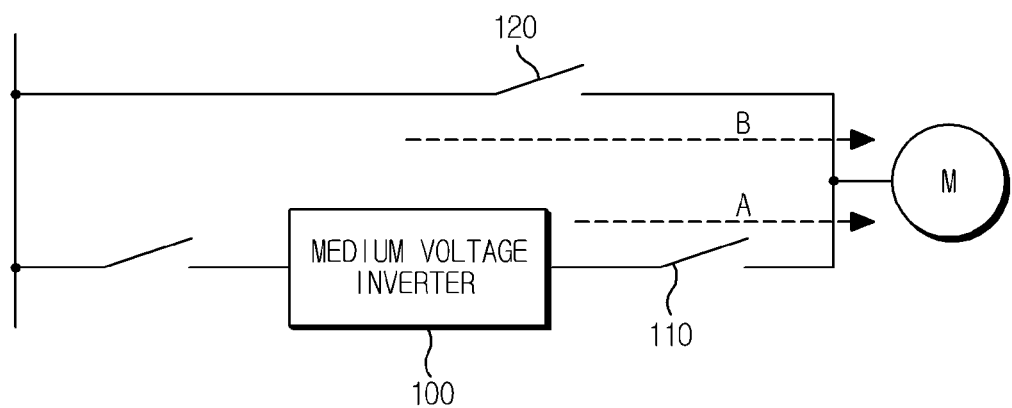
FIG. 2 is an exemplified view illustrating an operation of power change of FIG. 1.

In describing the present disclosure, detailed descriptions of constructions or processes known in the art may be omitted to avoid obscuring appreciation of the invention by a person of ordinary skill in the art with unnecessary detail regarding such known constructions and functions. That is, in the drawings, the size and relative sizes of layers, regions and/or other elements may be exaggerated or reduced for clarity. Like numbers refer to like elements throughout and explanations that duplicate one another will be omitted.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

The present disclosure, provided to reduce an electric shock applied to a motor during switching operation between an output of an inverter and a commercial power source, synchronizes sizes and phases of two power sources to allow the two power sources to be simultaneously applied to the motor during a predetermined period of time and to prevent the two power sources from being instantly interrupted, and installs a reactor between the two power sources to eliminate an electric shock by a current.

The present disclosure is configured such that the motor is connected to the commercial power source; in a case repair/maintenance of the inverter is required while the speed of the motor is controlled by the inverter, to be applicable to a case where the inverter is inoperative.

Hereinafter, exemplary embodiments of the present disclosure will be described in detail with reference to the accompanying drawings.

Figure 3:
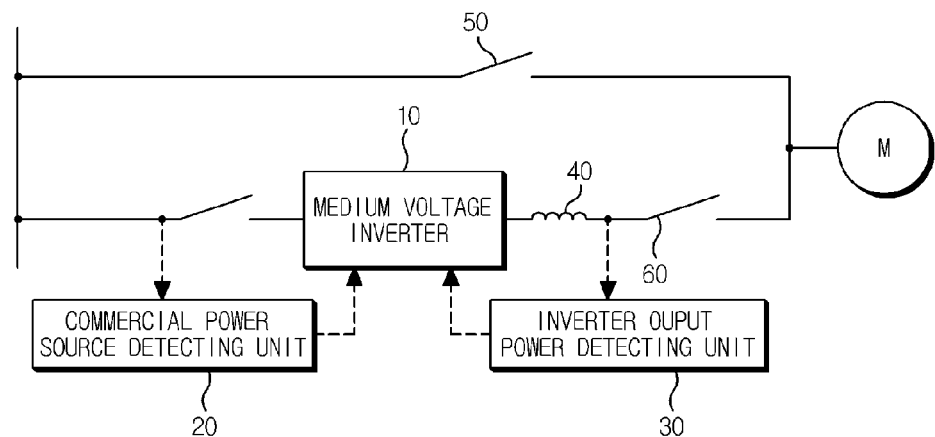
FIG. 3 is a block diagram illustrating a medium voltage inverter system according to an exemplary embodiment of the present disclosure.

FIG. 3 is a block diagram illustrating a medium voltage inverter system according to an exemplary embodiment of the present disclosure, where a part of a system like that of FIG. 1 is enlarged, and where the system is a medium voltage inverter system for multi-soft starter for a plurality of motors, and where the plurality of motors is not illustrated and omitted for convenience sake.

Referring to FIG. 3, the medium voltage inverter system according to an exemplary embodiment of the present disclosure comprises a medium voltage inverter (10), a commercial power source detecting unit (20), an inverter output power detecting unit (30), a reactor (40), a commercial power source switch (50) and an inverter switch (60).

The commercial power source detecting unit (20) measures an inputted commercial power source. The inverter output power detecting unit (30) measures a power at an input side of a motor (M), i.e., an output power of the medium voltage inverter (10).

Furthermore, the commercial power source switch (50) switches a bypass from the commercial power source to the motor (M), and the inverter switch (60) switches an output of the medium voltage inverter to the motor (M). The reactor (40) is arranged between the medium voltage inverter (10) and the inverter switch (60) to prevent the commercial power source and the output power of the medium voltage inverter (10) from colliding, in a case the commercial power source and the output power of the medium voltage inverter (10) are simultaneously connected to the motor. The reactance of the reactor (40) may be designed in consideration of degree of restricting the size of circulating current in response to voltage difference between the two power sources, and a drop portion of the output voltage of the medium voltage inverter (10) generated by the reactor (40)

Figure 4:
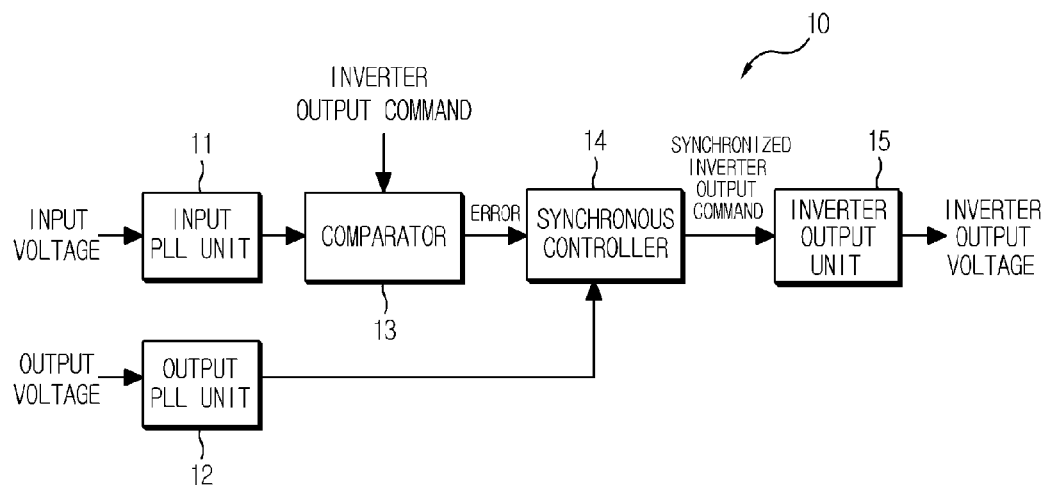
FIG. 4 is a block diagram illustrating a medium voltage inverter control apparatus according to an exemplary embodiment of the present disclosure.

FIG. 4 is a block diagram illustrating a medium voltage inverter control apparatus according to an exemplary embodiment of the present disclosure, where the apparatus is embedded in the medium voltage inverter (10) of FIG. 3. Although the medium voltage inverter (10) may comprise a plurality of other constituent elements in addition to the control apparatus, the explanation thereof unrelated to the present disclosure is omitted for convenience sake.

Referring to FIG. 3, the medium voltage inverter control apparatus according to an exemplary embodiment of the present disclosure may comprise an input PLL (Phase Locked Loop) unit (11), an output PLL unit (12), a comparator (13), a synchronous controller (14) and an inverter output unit (15).

The input PLL unit (11) receives an input voltage (i.e., a commercial power source) of the medium voltage inverter (10) from the commercial power source detecting unit (20), and determines information such as size and phase of the input voltage of the medium voltage inverter (10) therefrom.

The comparator (13) compares the input voltage received from the input PLL unit (11) with an output command of the medium voltage inverter (10) and outputs an error. The synchronous controller (14) outputs a synchronized inverter output command to stably control the inverter output voltage, lest the inverter output voltage should be abruptly changed. The inverter output unit (15) outputs an output voltage by using the synchronized inverter output command received from the synchronous controller (14).

Meantime, a detailed explanation on cascade type of the medium voltage inverter (10) will be omitted as it is well known to the skilled in the art, the cascade type of the medium voltage inverter (10) being that the inverter determines an output voltage in response to a voltage command determined by a master controller (not shown) via a PWM (Pulse Width Modulation) controller of each cell and a power conductor.

Furthermore, the output PLL unit (12) outputs an output voltage in response to an inverter output power detected by the inverter output power detecting unit (30), determines information of the output voltage including sizes and phases thereof and sends back to the synchronous controller (14).

Now, operation of medium voltage inverter control apparatus according to the present disclosure will be described with reference to FIGS. 3 and 4.

The present disclosure relates to the switching of the commercial power source of the medium voltage inverter (10) to thereby minimize an electric shock applied to the motor (M). The electric shock is generated by changes in size and phase of an input voltage at the motor (M), and is generated at an instant intermittence section where both the commercial power source switch (50) and the inverter switch (60) are open.

Thus, the sizes and phases of the output of the medium voltage inverter and the commercial power source must be same in order to reduce the electric shock generated while the voltage inputted to the motor (M) is changed from the output voltage of the medium voltage inverter (10) to the commercial power source.

To this end, the medium voltage inverter control apparatus of FIG. 4 according to the present disclosure is configured to synchronize the inverter output voltage and the commercial power source using input voltage information. In the medium voltage inverter control apparatus according to the present disclosure, the input PLL unit (11) determines information and size of 3-phase input voltage, the comparator (13) compares an inverter output command of the medium voltage inverter with the output of the input PLL unit (11), and the synchronous controller (14) determines the synchronized inverter output command.

At this time, the inverter output power detecting unit (30) measures an output voltage at a rear end of the reactor (40), in consideration of reactor (40), and the synchronous controller (14) compensates a phase delay of voltage generated by the reactor (40). Thus, if the switching is implemented by synchronizing the commercial power source and the inverter output voltage according to the present disclosure, the electric shock generated by the voltage difference can be considerably reduced.

Meanwhile, there is a need of eliminating the intermittence section in order to reduce the electric shock generated at the intermittence section, which means that the commercial power source and the inverter output voltage must be simultaneously inputted into the motor (M). Theoretically, in a case two power sources are simultaneously supplied, an infinite circulating current can be inputted to each power source by voltage difference of several voltages. In order to prevent this phenomenon, two reactors (40) according to the present disclosure are arranged between the two power sources.

Although the reactor (40) performs a filtering function of making a PWM waveform, which is a characteristic of the inverter output voltage, similar to a sign waveform of the commercial power source, and if the reactance of the reactor (40) is too large, the enlarged reactance becomes a factor causing a voltage drop of the inverter output during operation of the medium voltage inverter (10), and therefore, the reactance must be determined through an adequate design.

According to the present disclosure, an output voltage of the medium voltage inverter (10) is synchronized with that of the commercial power source using the synchronous controller (14) to eliminate the instant intermittence section during the switching operation, whereby an electric shock generated in the course of switching operation can be considerably reduced. Thus, the multi-soft starter instantly starting a plurality of medium voltage motors can be carried out by the medium voltage inverter (10).

Although the present disclosure has been described with reference to a number of illustrative embodiments thereof, it should be understood that numerous other modifications and embodiments can be devised by those skilled in the art that will fall within the spirit and scope of the principles of this disclosure.

What is claimed is:

1. A medium voltage inverter control apparatus, the control apparatus comprising:
    a first PLL (Phase Locked Loop) unit configured to determine input voltage information by receiving an input voltage of the medium voltage inverter;
    a comparator configured to output a difference of a comparison between an output command of the medium voltage inverter and an output of the first PLL unit;
    a synchronous controller configured to synchronize the output command of the medium voltage inverter using the difference;
    an output unit configured to output a voltage to the medium voltage inverter using the synchronized output command of the medium voltage inverter; and
    a second PLL unit configured to determine output voltage information by receiving the voltage output by the output unit.

2. The control apparatus of claim 1, further comprising:
    a first detecting unit arranged at an input terminal of the medium voltage inverter and configured to detect the input voltage of the medium voltage inverter and to transmit the input voltage to the first PLL unit.

3. The control apparatus of claim 1, wherein the synchronous controller is further configured to synchronize the output command of the medium voltage inverter by receiving the output voltage information from the second PLL unit.

4. A medium voltage inverter system driving a motor, the system comprising:
    a first switch configured to switch an output voltage from the medium voltage inverter to the motor;

a second switch configured to switch a commercial power source to the motor;

a reactor arranged between the first switch and the medium voltage inverter; and a controller configured to synchronize the output voltage from the medium voltage inverter with the commercial power source to provide a synchronized output command to the medium voltage inverter.

5. The system of claim 4, wherein the controller comprises:

a first PLL unit configured to determine input voltage information by receiving an input voltage of the medium voltage inverter;

a comparator configured to output a different of a comparison between an output command of the medium voltage inverter and an output of the first PLL unit; and a synchronous controller configured to synchronize the output command of the medium voltage inverter using the difference.

6. The system of claim 5, further comprising:

a first detecting unit arranged at an input terminal of the medium voltage inverter and configured to detect the input voltage of the medium voltage inverter and to transmit the input voltage to the first PLL unit.

7. The system of claim 5, wherein the controller further comprises:

an output unit configured to output the output voltage to the medium voltage inverter using the synchronized output command.

8. The system of claim 7, wherein the controller further comprises:

a second PLL unit configured to determine output voltage information by receiving the voltage output by the output unit.

9. The system of claim 8, wherein the synchronous controller is further configured to synchronize the output command of the medium voltage inverter by receiving the output voltage information from the second PLL unit.

10. The system of claim 4, wherein a reactance of the reactor is determined in consideration of a degree of restricting a size of a circulating current in response to a voltage difference between the output voltage from the medium voltage inverter and the commercial power source.

11. The system of claim 4, wherein a reactance of the reactor is determined in consideration of a drop portion of the output voltage from the medium voltage inverter generated by the reactor.

* * * * *